United States Patent
Behringer et al.

(10) Patent No.: US 10,223,613 B2
(45) Date of Patent: Mar. 5, 2019

(54) MACHINE INTELLIGENT PREDICTIVE COMMUNICATION AND CONTROL SYSTEM

(71) Applicant: Microsoft Technology Licensing, LLC, Redmond, WA (US)

(72) Inventors: Adam Edwin Behringer, Seattle, WA (US); Johnny H Lee, Sammamish, WA (US); Stephen David Bader, Seattle, WA (US); Hsiao-Lan Wang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 145 days.

(21) Appl. No.: 15/169,546

(22) Filed: May 31, 2016

(65) Prior Publication Data

US 2017/0344854 A1    Nov. 30, 2017

(51) Int. Cl.
*G06K 9/00* (2006.01)
*G06K 9/62* (2006.01)
*G06N 99/00* (2019.01)
*G06F 17/30* (2006.01)

(52) U.S. Cl.
CPC ..... *G06K 9/6262* (2013.01); *G06F 17/30029* (2013.01); *G06K 9/00624* (2013.01); *G06N 99/005* (2013.01); *G06K 2209/27* (2013.01)

(58) Field of Classification Search
CPC ............ G06K 9/00624; G06K 9/6262; G06K 2209/27; G06F 17/30029; G06N 99/005
See application file for complete search history.

(56) References Cited

U.S. PATENT DOCUMENTS

| 5,689,442 | A  | * | 11/1997 | Swanson  | G08B 13/19647 340/500 |
| 9,159,036 | B2 | * | 10/2015 | Fowler   | G06Q 10/00 |
| 9,509,922 | B2 | * | 11/2016 | Reichert, Jr. | G06T 3/00 |
| 2005/0043941 | A1 | * | 2/2005 | Janakiraman | G06F 17/2863 704/10 |
| 2005/0189412 | A1 | * | 9/2005 | Hudnut | A47F 9/046 235/383 |
| 2006/0179453 | A1 |   | 8/2006 | Kadie et al. | |
| 2008/0101660 | A1 | * | 5/2008 | Seo | G06F 17/30032 382/118 |

(Continued)

FOREIGN PATENT DOCUMENTS

JP    2005301479 A    10/2005

OTHER PUBLICATIONS

Bravo et al, ("visualization services in a conference context: an approach by RFID Technology", Journal of Universal computer science, vol. 12, No. 3, (2006), pp. 270-283) (Year: 2006).*

(Continued)

*Primary Examiner* — Amara Abdi

(57) ABSTRACT

A machine intelligent communication and control system is able to dynamically predict and adapt information presented to various users. The system provides a personalized experience with its ability to identify users, become contextually aware of the user's location and environment, identify objects and actions, and present customized information tailored for the user and the current environment. The system is further able to control connected items within the environment based upon various user preference considerations.

20 Claims, 7 Drawing Sheets

(56) References Cited

U.S. PATENT DOCUMENTS

| | | | |
|---|---|---|---|
| 2008/0208912 | A1 | 8/2008 | Garibaldi |
| 2008/0227440 | A1* | 9/2008 | Settepalli ........ H04M 1/274558 455/418 |
| 2008/0278583 | A1* | 11/2008 | Evenson, II ......... H04N 5/4403 348/164 |
| 2009/0322671 | A1 | 12/2009 | Scott et al. |
| 2011/0075993 | A1* | 3/2011 | Pastrnak ................ G11B 27/02 386/285 |
| 2011/0173204 | A1* | 7/2011 | Murillo .................. G06F 3/017 707/741 |
| 2012/0257048 | A1 | 10/2012 | Anabuki et al. |
| 2013/0090103 | A1* | 4/2013 | Kim .................. H04M 1/72577 455/418 |
| 2014/0222580 | A1* | 8/2014 | Lee .................. G06F 17/30867 705/14.64 |
| 2016/0139273 | A1* | 5/2016 | Sobol ...................... G01S 19/16 342/357.52 |
| 2016/0283494 | A1* | 9/2016 | Krishnaswamy ............................ G06F 17/30663 |

OTHER PUBLICATIONS

Hile, et al., "Information Overlay for Camera Phones in Indoor Environments", In Proceedings of Third International Symposium Location- and Context-Awareness, Sep. 20, 2007, pp. 68-84.

Gomez-Romero, et al., "Context-based scene recognition from visual data in smart homes—an Information Fusion approach", In Journal of Personal and Ubiquitous Computing, vol. 16, Issue 7, Oct. 2012, pp. 1-23.

Ajanki, et al., "An augmented reality interface to contextual information", In Journal of Virtual Reality, vol. 15, Dec. 16, 2010, pp. 161-173.

Ribeiro, et al., "Human Activity Recognition from Video: modeling, feature selection and classification architecture", In Proceedings of Workshop on Human Activity Recognition and Modelling, Sep. 9, 2005, 10 pages.

Lv, et al., "Single View Human Action Recognition using Key Pose Matching and Viterbi Path Searching", In Proceedings of IEEE Computer Society Conference on Computer Vision and Pattern Recognition, Jun. 18, 2007, 8 pages.

Liu, et al., "Recognizing Realistic Actions from Videos "In the Wild"", In Proceedings of IEEE Computer Society Conference on Computer Vision and Pattern Recognition, Jun. 20, 2009, pp. 1996-2003.

Baldauf, et al., "A Survey on Context-Aware Systems", In the International Journal of Ad Hoc and Ubiquitous computing, vol. 2, Issue 4, Jan. 1, 2007, pp. 263-277.

Bravo, et al., "Ubiquitous Computing in the Classroom: An Approach through Identification Process", In the Journal of Universal Computer Science, vol. 11, Issue 9, Sep. 28, 2005, pp. 1494-1504.

Bravo, et al., "Visualization Services in a Conference Context: An Approach by RFID Technology", In the Journal of Universal Computer Science, vol. 12, Issue 3, Mar. 28, 2006, pp. 270-283.

Ho, et al., "Using Context-Aware Computing to Reduce the Perceived Burden of Interruptions from Mobile Devices", In Proceedings of the Special Interest Group on Computer—Human Interaction Conference on Human Factors in Computing Systems, Apr. 2, 2005, pp. 909-918.

"International Search Report and Written Opinion Issued in PCT Application No. PCT/US2017/033441", dated Jul. 19, 2017, 20 Pages.

Poellabauer, Christian, "Context Awareness", Retrieved from «https://www3.nd.edu/~cpoellab/teaching/cse40827/lecture9.pdf», Sep. 20, 2009, 8 Pages.

Schmidt, Albert, "Interactive Context-Aware Systems Interacting with Ambient Intelligence", Retrieved from «http://www.neurover.org/emerging/book5/09_AMI_Schmidt.pdf», Jan. 1, 2005, pp. 159-178.

* cited by examiner

MACHINE INTELLIGENT PREDICTIVE COMMUNICATION AND CONTROL SYSTEM

BACKGROUND

People desire to receive some well-timed information to help manage their daily lives, including notifications of scheduled events, educational assistance for completing unfamiliar tasks, and healthcare related information, including reminders to take medication. Moreover, people desire to receive information at the appropriate time, at the appropriate location, through the appropriate medium, at an appropriate level of detail, and on an appropriate device.

Conventionally, information may be provided to a user at an inconvenient time or in an inconvenient format. For example, a user may receive an email or a text message while they are driving which may be hard to access and may cause a distraction if the user checks the message. Additionally, a notification may interrupt a user during a meeting.

SUMMARY

Systems and methods are provided herein that identify a user that is interacting with the system and provide contextually relevant information at a convenient time, at an appropriate location, through one or more available mediums, at a reasonable level of complexity based upon the knowledge of the user, at the right level of detail and on an appropriate device. The system is machine intelligent, which includes machine vision and machine learning to enable contextual awareness, object detection and identification within the environment, and activity detection and identification. The system uses this information to personalize the experience of one or more users within the environment.

According to some embodiments, a system includes an optical sensor, which may be a color camera, a depth camera, such as an infrared camera, a light sensor, or other type of optical sensors. The system may further include one or more audio sensors, such as a microphone for capturing sound and generating audio data that may be analyzed to search for speech voice print recognition, word recognition, speech to text conversion, or some other operation. One or more displays are preferably provided to present information to a user. The displays may include various sizes, various levels of resolution capability, and may also incorporate one or more optical sensors and/or audio sensors within the display. One or more user devices may also be a part of the system, and the user devices may incorporate optical sensors, audio sensors, displays, and location data hardware and software. Additional auxiliary sensors may also form a part of the described system and may generate data related to a variety of factors that influence the environment or the user.

In one implementation, the system gathers information, such as through the optical sensors, the audio sensors, the auxiliary sensors, and one or more databases, to determine a context for a user and to further determine a goal of the user. The optical sensors and audio sensors may determine, for example, the identity of a user interacting with a system and may further determine an activity that the user is engaged in by capturing video data of the user and comparing the actions of the user to a database containing known actions to determine a goal, or a desired outcome of the activity that user is engaged in.

Moreover, the system gathers information about the user from a user profile database, which may include information such as preferences of a user, routines or habits of a user, historical behavior, health information, social media information, historical purchasing behavior, educational and professional qualifications, and skill levels of the user at various tasks.

Based upon the information the system gathers about the environment and the user, the system is able to provide information to the user considerately. That is, the system can provide relevant information to the user at an appropriate time, at an appropriate level of detail, on an appropriate device, and in an appropriate format.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical elements.

DETAILED DESCRIPTION

Figure 1:
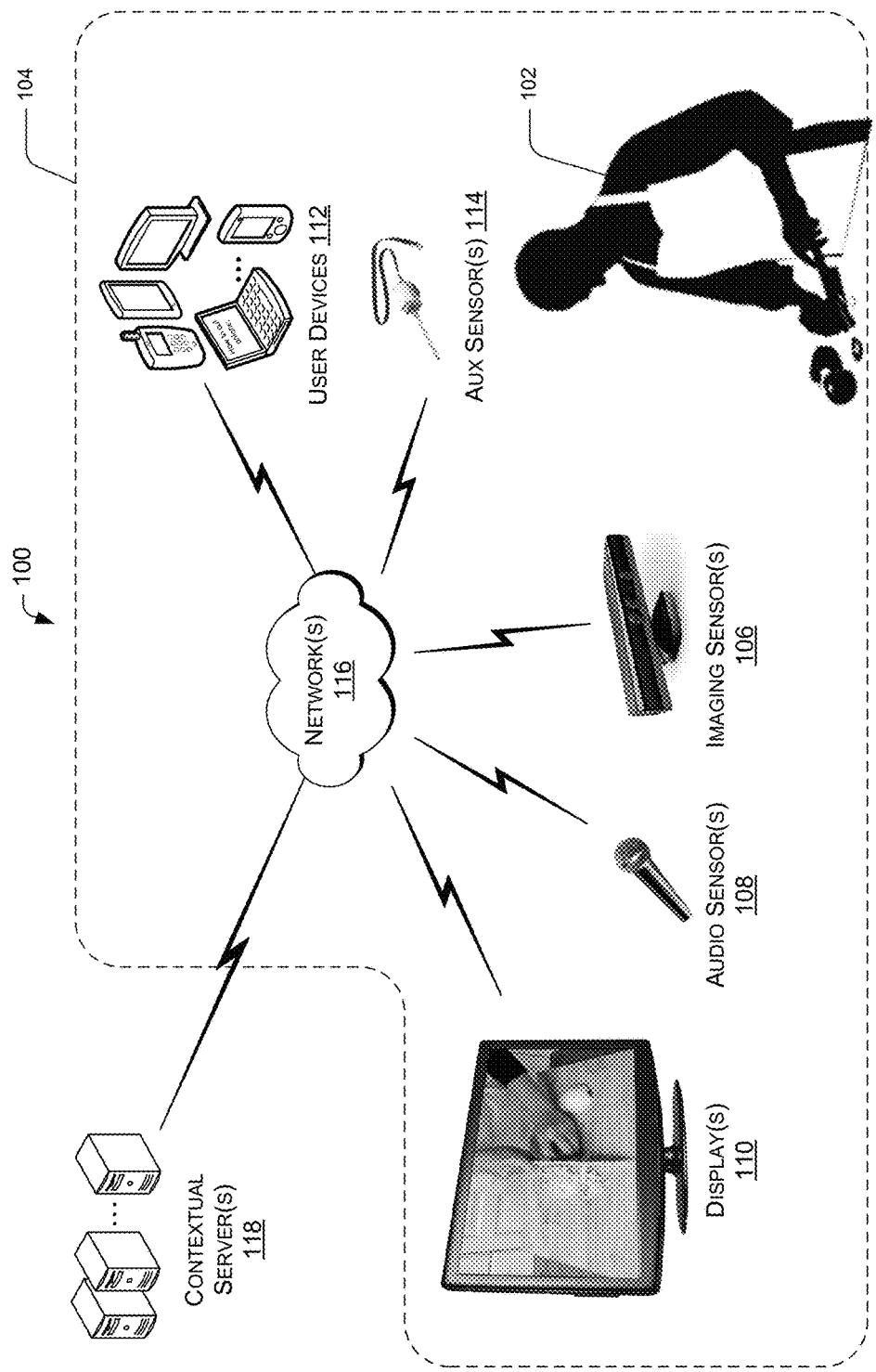
FIG. 1 is an illustration of one embodiment of a machine intelligent predictive communication and control system.

The techniques and systems described herein can be used to provide a machine intelligent system that can use machine vision and machine learning to become contextually aware of an environment, identify one or more users within the environment, detect and identify objects and actions within the environment, and provide notifications to the user as well as information associated with a task performed by a user to help the user achieve a determined goal. The notifications and information are provided to the one or more users at the appropriate time, through an appropriate medium, on an appropriate device, and at the right level of detail. The information may additionally include reminders, educational assistance in completing tasks, or responses to requests from a user.

In one implementation, the system may be an intelligent and considerate notification system that can provide reminders and information to a user at a convenient time in a convenient way. For example, where an identified user has been prescribed medication that needs to be taken throughout the day, in the morning while getting ready for work, the system may provide an audible voice notification reminding the user to take his medication, such as through the speakers of a home stereo system. However, while at a business lunch later that day, the system may provide a more subtle reminder, such as a vibration through the user's watch, which may be more preferable for the user than providing an audible reminder which may be embarrassing for the user while in public. The system is contextually aware that the user may be at a business lunch meeting based one or more factors, such as, for example, GPS location data from an electronic device carried by the user that indicates the user is at a restaurant, calendar data from an online-accessible calendaring system that indicates the user has a meeting at a destination which may further include attendee information, or through some other mechanism.

Another aspect provides for a contextually aware system that may provide assistance with completing unfamiliar tasks. For example, through various sensors, such as cameras, depth sensors, or other data gathering sensors, the system may determine that the user is in the kitchen and beginning to prepare a meal. The system may have access to a meal plan prepared by, or provided to, the user, and can determine when the user is beginning to prepare the meal based upon activities in the kitchen. As an example, where the user begins to retrieve ingredients necessary to prepare the meal, the system can identify the objects that the user is retrieving from the pantry, the refrigerator, or the cabinets, and become aware that the goal of the user is meal preparation.

By using various sensors, the system is able to determine the context, such as location, the identity of the user, objects present in the environment, and activities taking place. Continuing the example, as the user begins preparing the meal, the system may automatically retrieve the recipe and display it upon any of a number of devices, such as on a wall-mounted display within the kitchen, on a display embedded within a kitchen island, or may provide audible instructions to the user as the user continues the meal preparation. Moreover, where there are tasks that the user may be unfamiliar with, the system may offer suggestions or advice, and in some cases, may dynamically provide video instructions output to the wall-mounted, or kitchen-island embedded, display. The system may additionally or alternatively provide photographic instructions, convert the instructions to line drawing instructions where a simpler instruction is desirable or where the display is better able to display the lower resolution instructions, or may provide verbal instructions depending on the context.

The resulting system is able to intelligently determine what information should be provided, when it should be provided, how it should be provided, and the information can be tailored to the identified individual that the system is interacting with. For example, where the system identifies the user as a teen-ager with little cooking experience, the system may determine that the user would benefit from step-by-step instructions with video assistance to teach the user how to blanch and peel tomatoes as the recipe calls for. However, where the system determines, such as through a user's profile, which may include social networking profiles, that the user's last three job titles were head-chef at various restaurants, the system may appropriately determine that such detailed instructions are not necessary and will provide a much sparser set of instructions to a trained chef.

The system may further update the user's profile with information it learns about the individual user, such as the user's level of knowledge or experience with a particular subject or activity so that the system can provide the appropriate level of detail and assistance in the future. For example, when assisting a particular user with preparing meals in the kitchen, the system may recognize that the user consistently forgets to pre-heat the oven when beginning a recipe. The system may note this in the user's profile, and in addition, may automatically turn on the oven as the user begins preparing the meal. Of course, the system may first prompt the user to pre-heat the oven, or inquire whether the user wants the system to begin pre-heating the oven, or in some cases, the system may turn on the oven automatically. In this way, the system learns how to interact with individual users to provide the most benefit.

FIG. 1 illustrates one embodiment of a machine intelligent predictive communication and control system 100 ("system") and includes various hardware components and software components. A user 102 is present in an environment 104 which may include one or more imaging sensors 106 and one or more audio sensors 108. The imaging sensors 106 may include a charge coupled device ("CCD"), a complementary metal oxide semiconductor ("CMOS"), an infrared ("IR"), a near-infrared ("NIR"), or other suitable type of imaging sensor 106 to generate data about the environment 104 to determine the context. As used herein, the word "context" is a broad term and is used to refer to the environment 104, the objects within the environment 104, and activities occurring within the environment 104. Thus, the contextually-aware system described herein gathers data to ascertain the identity of the users present, the objects that are present, and what the user(s) are doing within the environment 104.

The imaging sensors 106 may be configured to capture the environment and generate video data or still image data in order to determine the context. In addition one or more audio sensors 108 may be present in order to capture audio signals and generate audio data, such as to provide for audible interaction with the system 100. Moreover, in some embodiments, the audio data may be used along with voice print recognition capabilities of the system 100 in order to identify the user(s) present within the environment 104 based upon the voice of the user.

One or more displays 110 may be present in order to provide visual information to users within the environment 104. The display 110 may be any suitable display device or combination of display devices, such as, for example, a computer monitor, a television display, a head-mounted see-through display, a mobile computing device, a tablet display, a projection device, a smartphone display, or any other such suitable display device.

User devices 112 may be integrated with the system 100 to receive input from the environment 104 or output information to the user 102. It should be appreciated that many user devices 112, such as smartphones, tablets, desktop or laptop computing devices, head mounted computing devices, wearable devices, smart watches, and others, have built-in capabilities for capturing audio and video, which may be used in conjunction with, or in lieu of, the imaging sensor 106 and the audio sensor 108, and also have built-in displays that may be utilized by the system for information presentation. In some instances, the user device 112 allows the system 100 to interact with the user at any location that provides internet access through any suitable connection method, such as Wi-Fi, wired internet, cellular signals, or other wired or wireless connection method.

Auxiliary sensors 114 ("Aux sensors") may be provided within the environment 104 for generating data relevant to any measurement of interest. For example, some such aux sensors 114 may include temperature sensors, humidity sensors, pH sensors, bioinformatics sensors, light meters, UV sensors, laser sensors, gas sensors, motion sensors, cameras, microphones, and other suitable sensors that can provide data to the system 100 for evaluation to aid the system 100 in determining the context.

In some embodiments, the imaging sensors 106, audio sensors 108, displays 110, user devices 112, and aux sensors 114 may be connected to a network 116 which may provide communication connectivity with each of the devices and may provide further communication with one or more contextual servers 118. At a general level of description, the contextual servers 118 are able to receive the data generated by the sensors, analyze the data, and determine the context which may include determining the location, identifying objects, identifying users, and identifying activities, among other things. Moreover, the contextual servers 118 are further able to determine information to provide to the user 102 and personalize that information based upon a profile of the user 102. For example, the level of detail may be adjusted based upon the skill or knowledge of the user 102 in an area that relates to the subject matter of the information to be provided.

Figure 2:
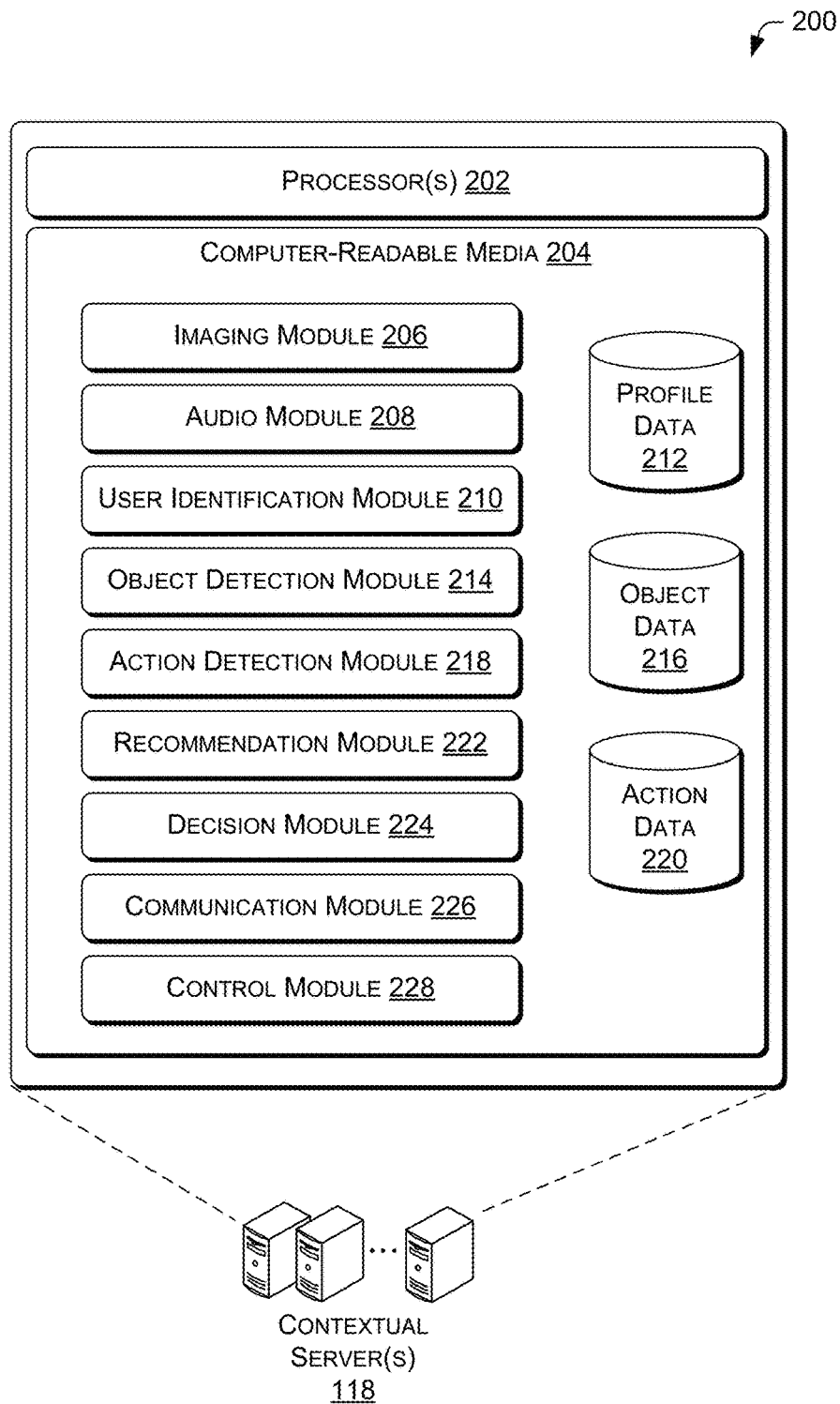
FIG. 2 is an illustration of a sample embodiment of a contextual server that may be used with the system of FIG. 1.

With reference to FIG. 2, the contextual servers 118 may include one or more processors 202 and computer-readable media 204 communicatively coupled to the one or more processors 202. The contextual servers 118 may be located within close proximity to the environment 104 or may be located remotely. In some instances, the contextual servers 118 are cloud-based computing resources that receive data through the network 116.

The computer-readable media 204 stores one or more modules and may store, or have access to, databases. Such modules and databases may include an imaging module 206, an audio module 208, a user identification module 210, a profile database 212, an object detection module 214, an object database 216, an action detection module 218, an action database 220, a recommendation module 222, a decision module 224, a communication module 226, and a control module 228.

The computer-readable media 204 is non-transitory and may store various instructions, routines, operations, and modules that, when executed, cause the processors to perform various activities. In some implementations, the one or more processors 202 are central processor units (CPU), graphics processing units (GPU) or both CPU and GPU, or any other sort of processing unit. The non-transitory computer-readable media 204 may include volatile and nonvolatile, removable and non-removable tangible, physical media implemented in technology for storage of information, such as computer readable instructions, data structures, program modules, or other data. System memory, removable storage, and non-removable storage are all examples of non-transitory computer-readable media. Non-transitory computer-readable storage media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the system.

The imaging module 206 receives data from the imaging sensors 106 in the form of frames and is able to process the data, such as to correct exposure settings, such as white balance, sharpening, hue, saturation, and other types of image processing steps to improve the digital frames. The imaging module 206 may receive frames of video data and may extract one or more frames as still images for further processing or use by other modules within the contextual servers 118.

The audio module 208 receives audio data from the audio sensors 108 and processes the audio data to look for cues within the audio data, such as commands, instructions, questions, requests, or other such information that may be directed at the system 100. The audio module 208 may be programmed to detect certain phrases that indicate a user is directing verbal comments to the system 100, such as asking for assistance or issuing a command for the system 100 to take action or provide information. In some instances, the certain phrases are pre-recorded and analyzed by the system 100 to create patterns that can be matched with audio data received by the audio module 208. For example, a speech recognition engine within the audio module 108 takes the audio signals received by the audio sensor 108 and converts it into a series of numerical values that characterize the vocal sounds in the audio data. The numerical values may be compared with various databases, such as, for example, an acoustic model, a lexicon, or a language model. The comparison with the acoustic model may result in a match with pre-defined acoustic sounds generated by a particular user and the user identification module 210 may be trained to recognize the characteristics of the particular user's speech patterns and acoustic environments. In this way, the audio module 208 may identify a particular user based upon voice print matching.

The audio module 208 may further compare the received audio data with the lexicon which lists a large number of words in the language and provides information on how to pronounce each word. The language model represents the ways in which the words may be combined to increase the accuracy of the understanding by the system 100 of what the user is saying.

The user identification module 210 may receive imaging data and audio data to identify a particular user interacting with the system. For example, the user identification module 210 may use the imaging data along with face-recognition programming to identify a particular user that is interacting with the system 100. The imaging module 206 receives a digital image or a video frame and is configured to extract landmarks that correspond with facial features. The user identification module 210 may use these landmarks, such as the relative position, size, and/or shape of the eyes, nose, cheekbones, and jaw, and compares them with facial features of known individuals stored within the profile database 212. A profile associated with a user 102 may contain facial features that are quickly searchable by the user identification module 210 to identify a user 102 that is interacting with the system 100. In addition to simply identifying an individual, the user identification module 210 may also use the facial features to determine facial gestures of a user, which may correspond to the emotional state of the user. For example, the facial features of a user will exhibit repeatable landmarks depending on whether the user is happy or sad. The system can detect the subtle changes in facial features, body language, and pose of the user 102 to determine the physical and/or emotional state of a user. This information may be combined with audio data to further determine the physical or emotional state of the user.

In addition, the user identification module 210 may use audio data received by the audio module 208 to voice-match speech patterns with a user's profile stored in the profile database 212, through the use of voice biometrics. Speaker recognition is a pattern recognition issue and some of the various technologies that may be implemented to process and store voice prints in the profile database 212 for speaker recognition matching include frequency estimation, pattern matching algorithms, hidden Markov models, Gaussian mixture models, matrix representation, and vector quantization. In short, any suitable technique may be implemented to identify a speaker based upon a previously stored voice print.

Similar to the user identification module 210, the object detection module 214 works in much the same way. Both imaging data and audio data may be received and compared against objects stored within an object database 216 to find a matching object. When a person identifies an object by sight, say an apple, they do so by judging the shape, size, color, sheen, and other visual characteristics. In much the same way, the object detection module can determine the shape, size, color, sheen and compare these values against known objects stored in the object database 216 to identify the objects within the environment 104.

The object identification module 210 is able to analyze imaging data generated form the imaging sensors 106 and through various algorithms, such as edge detection, to detect instances of semantic objects of certain classes. There are many ways to perform edge detection; however, one of the common and simplest ways is by implementing a Gaussian smoothed step edge algorithm, which is an error function, to detect color value steps between adjacent pixels in a digital image. By detecting the edges, the object identification module 210 is able to isolate likely objects and then compare these objects with objects stored in the object database 216 to determine a match. In this way, the object detection module 214 is able to detect and identify objects within the environment 104.

The action detection module 218 may receive video data from the imaging module 206. In some embodiments, the video data may include depth data, such as from an infrared, or near-infrared imaging device, and can track motion that is occurring within the video data. Motion may be tracked, for example, by comparing the changes between sequential frames of video data. In some embodiments, the static objects may be removed from the video data and the motion may be isolated in order to more efficiently determine the actions taking place by comparing the motion with known actions stored within the action database 220 to determine the actions that are occurring within the environment 104.

The recommendation module 222 may be configured to provide recommendations to a user. Based upon the determined context, the system 100 may suggest that the user take one or more actions. As an example, an indoor herb garden may be present in the environment 104, and through data captured and provided to the system 100, the system 100 may analyze and determine that the herb garden would benefit from additional light. This recommendation may be made, for example, through detecting the quantity and quality of light by one or more sensors, or by detecting chemical levels within the plant or soil. The recommendation module 222 may then recommend to the user 102 that the herb garden be moved to a sunnier spot, or a reflector may be provided to increase the quality and quantity of sunlight that the herb garden is receiving, or take some other action to ameliorate the condition the system 100 has detected.

The decision module 224 may be configured to analyze the data captured from the various sensors within the environment and make a decision about an action that the system 100 should take. For instance, in the previous example where the recommendation module 222 determines that additional light would benefit the herb garden, the decision module 224 may determine that the user should be notified only after the user 102 has returned home from work, since it would not be beneficial to provide a notification regarding the herb garden while the user 102 is at work and cannot take the recommended action. Additionally, where the system 100 determines that a user 102 is performing an action within the environment 104, the decision module 224 may determine that the user 102 would benefit from instruction on how to complete the task. The decision module 224 may make this determination, for example, as a result of the action detection module 218 determining an action the user 102 is performing and noticing a deviation from a similar action stored within the action database 220.

The decision module 224 is further able to tailor the information to the specific user. For instance, where the system 100 determines that information should be provided to the user 102, the decision module 224 may determine that the information should be presented differently or at a different level of detail depending on whether the user 102 is a seven-year-old child or an adult. Likewise, the information may be customized depending on the level of knowledge or skill a user has in a specific area. For example, where the system 100 determines that the health of a plant within the environment 104 could be improved, the system 100 may inform one user that the plant needs more water. When providing information to a botanist, for example, the system 100 may provide the pH level of the soil and recommend agricultural lime to increase the pH level. In some instances, where the user 102 may not have agricultural lime on hand, the system 100 can conduct a transaction to purchase agricultural lime and have it shipped to the home of the user 102. The system 100 may do this after consulting with the user 102, and in some cases, may do this automatically, such as where the purchase is for consumable goods that the user 102 regularly purchases and stocks.

The communication module 226 is preferably programmed to communicate with one or more users through any of the available devices capable of communication. For example, where the decision module 224 determines that the user 102 could benefit from additional instruction, the communication module 226 determines the best way to provide the information to the user. In many instances, there may be multiple devices capable of receiving the information and providing it to a user 102 either visually, audibly, or haptically. Some of the ways the communication module 226 provides information is through SMS text messaging, email communication, audible notifications, voice communication, video communication, and haptic feedback, among others. The communication module 226 may determine that an important message needs to reach the user, but the system 100 is contextually aware that the user 102 is presently in a business meeting. The communication module 226 therefore determines that, rather than interrupting the user 102 with audible signals that could interrupt the business meeting, a text message, or haptic feedback provided through a watch associated with the user 102 are the most considerate ways of getting the information to the user 102.

In another instance, the communication module 226 may determine that an instructional video would be of most help to the user 102 and it provides an instructional video to a display 108 that is located near the current location of the user 102. Cooperating with the communication module 226 is the control module 228. The control module 228 can be effective in carrying out the activities determined by the decision module 224 and the communication module 226. For example, where the decision module 224 and communication module 226 determine that an instructional video geared toward a novice skill level would benefit the user, the control module 228 may turn on the television display and tune it to the proper input to allow the communication module 226 to present the instructional video on the television display that is in the same room as the user 102.

The control module 228 may be able to control many devices and appliances within the environment. As "smart"

appliances become more prolific, the control module 228 may be configured to interact with any of these appliances according to the methods described herein. For instance, where the system 100 determines that a user is beginning to prepare a meal, the control module 228 may automatically turn on the oven to the proper temperature. However, where the system 100 then determines that the user has left the kitchen and has become distracted by other tasks, the control module 228 may turn down the temperature on the oven, or turn off the oven completely.

It should be appreciated that the contextual servers 118 may be located remotely from the environment 104, may be located within the environment 104, or may be a combination of both with certain tasks shared between local computing resources and remote computing resources. For example, some users may be hesitant to provide their full profile to an online repository and may instead prefer to store their profile on a location computing resource. In either event, the contextual servers 118 are able to ascertain the location of a user 102 interacting with the system and be contextually-aware of the user 102. The contextual servers 118 may determine the location of the user 102 through various methods, such as for example, by global positioning service ("GPS") functionality on one or more user devices 112, or by imaging sensors 106 within the current environment 102 of the user, by determining the location of a Wi-Fi network that one or more user devices 112 are connected to, the presence of RFID tags, or any other suitable method.

FIGS. 3 through 7 are flow diagrams showing several illustrative routines for determining the context, providing relevant information to a user, and controlling objects within an environment, according to embodiments disclosed herein. It should be appreciated that the logical operations described herein with respect to FIGS. 3 through 7 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, or any combination thereof. It should also be appreciated that more or fewer operations may be performed than shown in the figures and described herein. These operations may also be performed in parallel, or in a different order than those described herein. Moreover, the operations described may be performed on multiple electronic computing devices with some operations shared between multiple devices.

Figure 3:
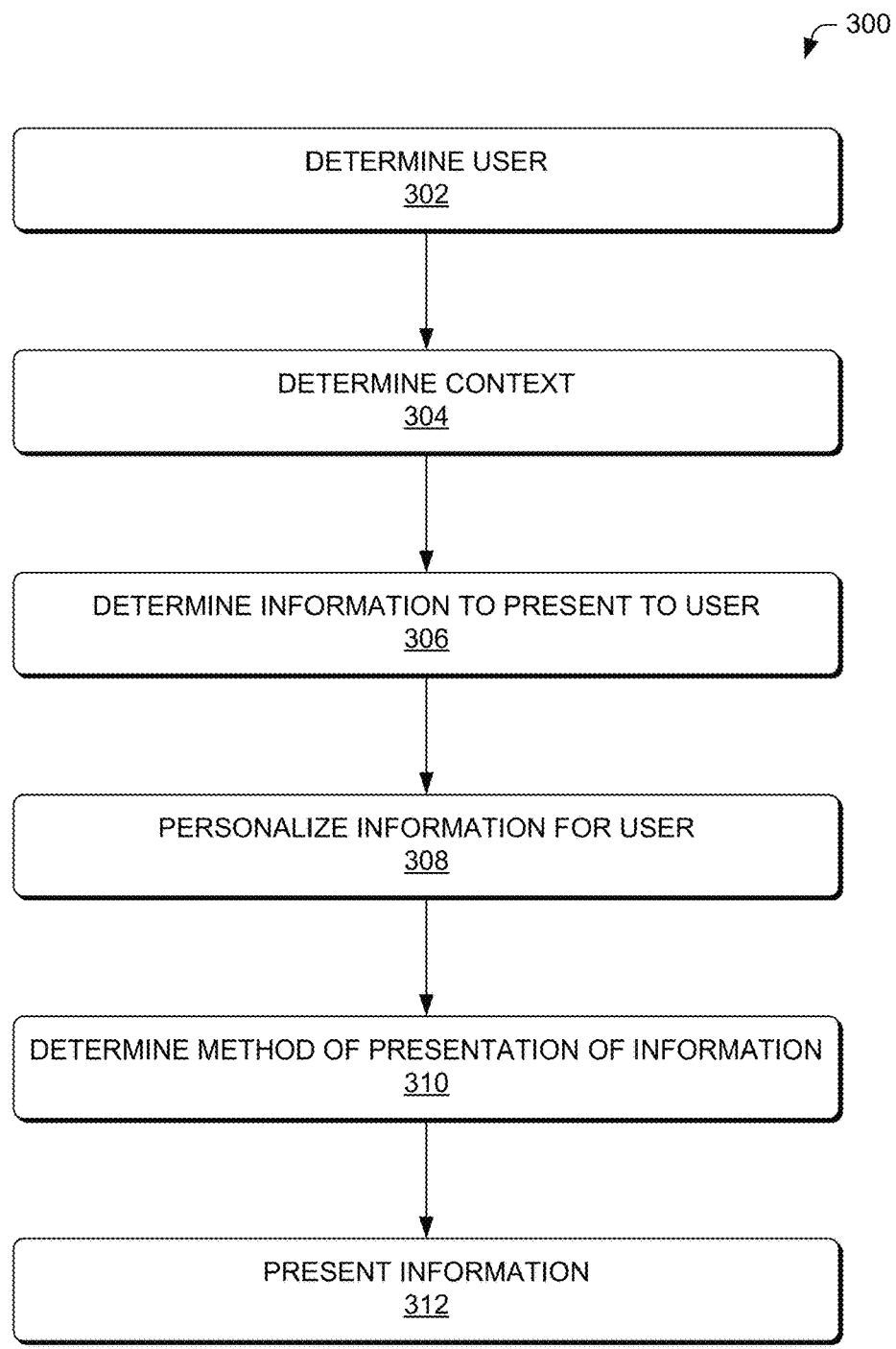
FIG. 3 is a flow diagram of an example process for providing relevant information based upon the context and the user interacting with the system of FIG. 1.

FIG. 3 illustrates an example process for providing relevant information 300 based upon the context and the user 102 interacting with the system 100. At block 302 the system determines the user 102. As described above, the system 100 may rely on facial recognition, voice print recognition, or some other form of recognition. Other examples of identity recognition may include the user self-identifying to the system, providing login credentials, the presence of an RFID tag, the presence of a mobile device, interacting with the system through a known electronic device associated with a particular user, or some other suitable method for identifying a user.

At block 304, the system determines the context. Using available sensors, the system is able to determine the location of a user, and through imaging sensors 106 identify objects and actions within the environment. For example, where the system 100 identifies a user seated at a table with computer components spread across the table and a desktop computer with the cover off, the system may recognize that the user is attempting to build, fix, or upgrade the computer. The system 100 may then provide contextually relevant assistance if needed.

At block 306, the system determines information relevant to the user. For example, the system 100 may determine, through determining the context such as the objects and actions depicted within imaging data generated by the imaging sensors 116, that the goal of the user 100 is to replace a video card in the computer and the system 100 can retrieve information related to the task at hand.

At block 308, the system 100 personalizes the information for the user 102. For example, where the system 100 analyzes data in the user profile associated with the user 102 and determines that the user 102 is a professional computer technician, the system 100 may provide much different information than if the user 102 is determined to be a chef with very little computer hardware experience. In the first case, the system 100 may remind the user 102 that he may need to disable the onboard video in the BIOS settings in order to use the dedicated video card being installed. In the latter case, the system may determine that the user 102 could benefit from a step-by-step guide to opening the computer case, identifying the correct slot on the motherboard, choosing the right cables, and installing drivers.

At block 310, the method of presentation of the information is determined. For instance, the system 100 may determine that there are several ways to format the information and several output devices for delivering the information. In the first case above, providing advice to an experienced user 102, the system 100 may display text on a display 110, such as a wall mounted display or a table-mounted display with nothing further. In the latter case where the user 102 is relatively inexperienced, the system 100 may provide step-by-step instructions in text form on one display 110, while simultaneously providing an instructional video demonstrating how to complete the task on another display 110.

At block 312, the system presents the information to the user 102. As another example, a user 102 may be in a first room when a video call arrives. The system 100 may display the video call on a wall-mounted display in the first room. However, as the user 102 moves from a first room to a second room, the system 100 may display the video call on a second display, such as a television in the family room. As the user 102 then moves to an office and sits down at a desk, the video call may automatically be transferred to a computer monitor sitting on the desk.

In this way, the system 100 is able to determine the context, such as where the location of the user 102, which direction the user 102 is looking, and how the user 102 is moving throughout the environment in order to present the information, the video call in this case, to the appropriate display 110 to allow the user the freedom to move throughout the environment 104 while maintaining the video call.

As another example, the system 100 may determine that a user 102 is standing in the kitchen at a kitchen island. They system 100, through its object detection module 214, may determine that the user 102 is holding a knife and there is an onion on the kitchen island. The system 100 may further track the motion of the user 102 and, by comparing the motion to the action database 220, may determine that the user 102 is cutting the onion. Additionally, through the object detection module 214, the system 100 may determine that the user 102 is slicing the onion. However, the system 100 may be aware that the recipe the user 102 is following indicates that the onion should be diced. The system 100 may be aware of the recipe through a variety of mechanisms, such as through a meal plan the user had previously entered into the system 100, or by the user searching earlier for a particular recipe to prepare.

The system 100 may offer advice on how to prepare the onion according to the recipe. In one instance, the system 100, through the user identification module 210, may identify that the user 102 cutting the onions is a very experienced home chef. In this case, the system may offer a gentle reminder that the recipe calls for diced onions rather than sliced. However, in another instance, where they system 100 determines that the user 102 is a novice home chef with little experience, the system 100 may provide a video instruction on a display 110 mounted in the kitchen showing the user 102 how to dice the onion. The system 100 may alternatively, or additionally, provide an image or a series of images on another display, such as a low-resolution display built into the kitchen island, that presents a diagram of how to dice onions.

In some cases, the capabilities of the various displays 110 within the environment may be vastly different, such as having different aspect ratios, resolution settings, color reproduction abilities, and the like. The system 100 may transliterate the information to be presented to the user 102 based upon the display 110 that is to be used. For instance, continuing with the onion example, a high resolution display mounted in the kitchen may be able to reproduce high resolution video, which may be appropriate for displaying video and audio to the user 102. A display embedded within the kitchen island may be a low-resolution display, and may only be suitable for line drawings and text. The system 100 may determine that presenting the information as one or more simple line drawings is an efficient way to provide the information to the user 102. Accordingly, the system 100 may extract frames of video data from an instructional video and convert these frames to line drawings for presentation on the low resolution display, thus transliterating the information from one format to another, more convenient, format and providing the information on an appropriate display 110.

Moreover, the system may further provide the information on multiple displays and in different formats, such as by presenting images on one display 110, a video file on another display 110, and providing sound through speakers associated with another user device 112.

Figure 4:
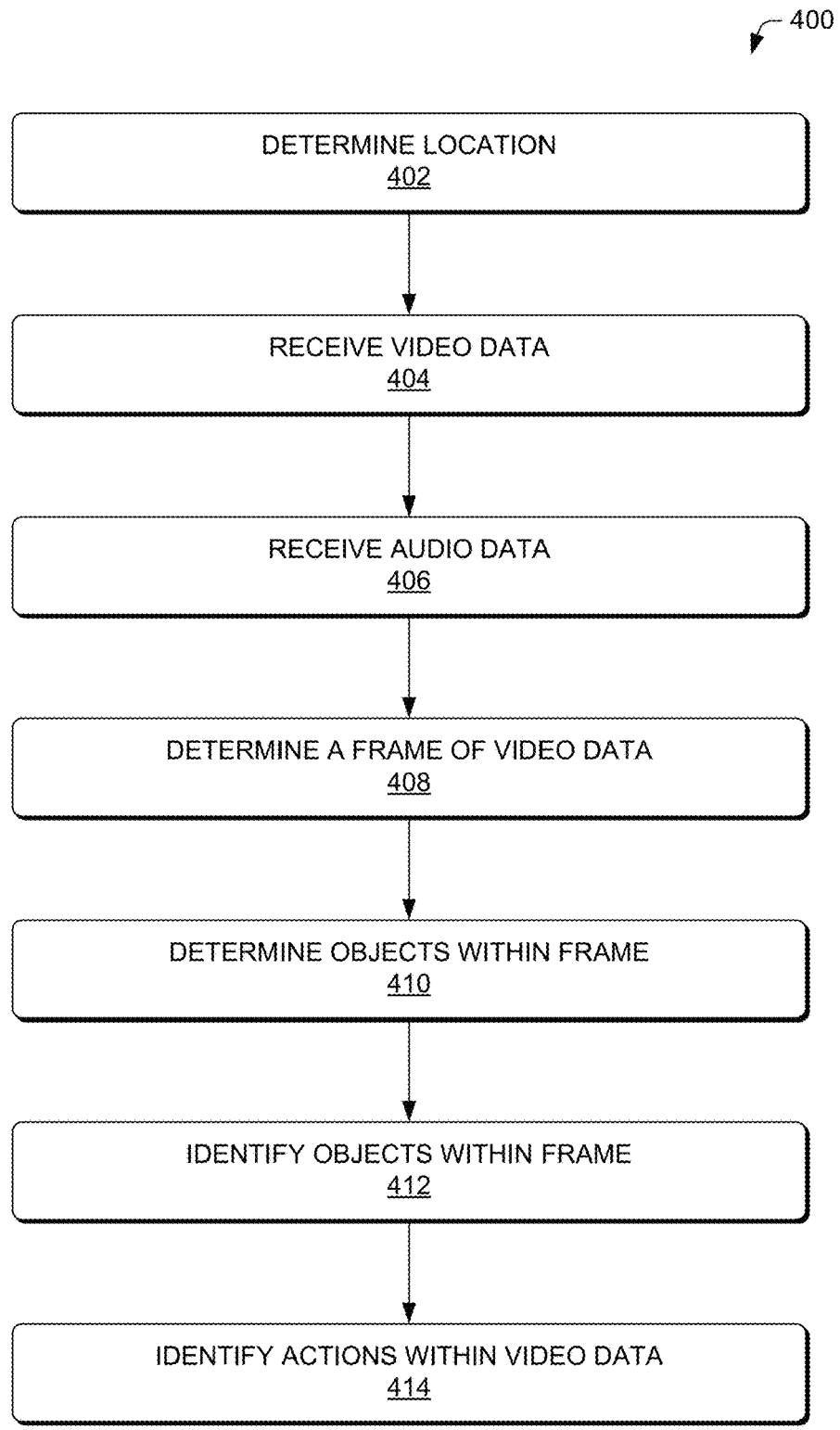
FIG. 4 is a flow diagram of an example process for determining context.

FIG. 4 provides an example process for determining the context 400 in order for the system 100 to provide information at a proper level of detail. It should be understood that the logical operations illustrated and described may be performed in an alternative order, in parallel, and some of the operations may be omitted in some implementations. At block 402, the location of the user is determined. This may be accomplished, for example, by locating a user device 112 associated with a user 102, such as by retrieving GPS location data from the user device 112. Additionally, the system 100 may detect that one or more user devices 112 are connected to a particular Wi-Fi network in order to determine the location of the user 102. In some instances, one or more optical sensors 106 may be mounted within an environment 104 and have a known location. As the optical sensors 106 detect a user 102, the user's location can be ascertained based upon the location of the optical sensors 106. Of course, other methods for determining a user's location may be utilized with the systems 100 described herein.

At block 404, the system 100 receives video data. The video data may be generated by one or more cameras, such as color cameras utilizing any suitable imaging sensor. In some implementations there are 1, 2, 3, or more cameras that may include CCD imaging sensors, CMOS imaging sensors, or other type of color imaging sensors. In addition, infrared, or near-infrared imaging sensors (collectively, "IR sensors") may be used in lieu of, or in conjunction with, the color imaging sensors. The IR sensors may be configured to capture depth information associated with objects within the field of view of the IR sensors, which may be helpful in determining relative size of objects or actions taking place within the field of view of the IR sensors.

1. At block 406, the system 100 receives audio data. The audio data may be captured by one or more audio sensors 108, such as one or more microphones located within the environment 104. Additionally, many user devices 112 may have audio sensors 108 integrated therein that may be utilized to capture audio signals. The audio data may be analyzed for voice print identification, for speech recognition, to identify objects within the environment, or some other useful purpose. As one example, the audio sensors 108 at the home of a user 102 may generate audio data that indicates that the motorized garage door has been opened and a car parked inside the garage. The system 100 may utilize this audio data in combination with a daily schedule of the user 102, and in further combination with the time of day to determine that the user 102 has arrived home from work. The system can then take appropriate action or provide relevant information based upon this context.

At block 408, the system 100 determines a frame of video data. In other words, the system may select and extract one or more image frames from a video stream for analysis. Alternatively, the system 100 may initially retrieve one or more still images from an imaging sensor 106. At block 410, the image frame is analyzed for object detection. The system 100, using the contextual servers 118, may analyze the image frame using any appropriate analysis algorithm, such as edge detection, edge matching, gradient matching, interpretation trees, and pose clustering, to name a few, to isolate the objects depicted within the image frame. At block 412, the contextual servers 118 may then compare the detected objects to one or more databases of known objects to identify objects within the image frame.

At block 414, multiple frames of video data may be analyzed to determine actions depicted within the video data. The multiple frames of video data may be sequential frames, or may be spaced, such as every 2 frames, 5 frames, 10 frames, or some other sequence of video data. The contextual servers 118 may isolate those parts of the frames that indicate action, or movement. Through the object detection taking place at block 410 and the action detection at block 414, the contextual servers may be able to determine the actions that are taking place within the environment 104. For example, the contextual servers 118 may determine that a first user 102 has entered the kitchen, retrieved a carrot from the refrigerator, and is now holding a knife and is chopping the carrot. Furthermore, the contextual servers 118 may identify the results of the action taking place, that is, the contextual servers 118 may identify, based upon the size of the carrots after being cut, that the user 102 is chopping, rather than slicing, peeling, shredding, or julienning the carrots.

Figure 5:
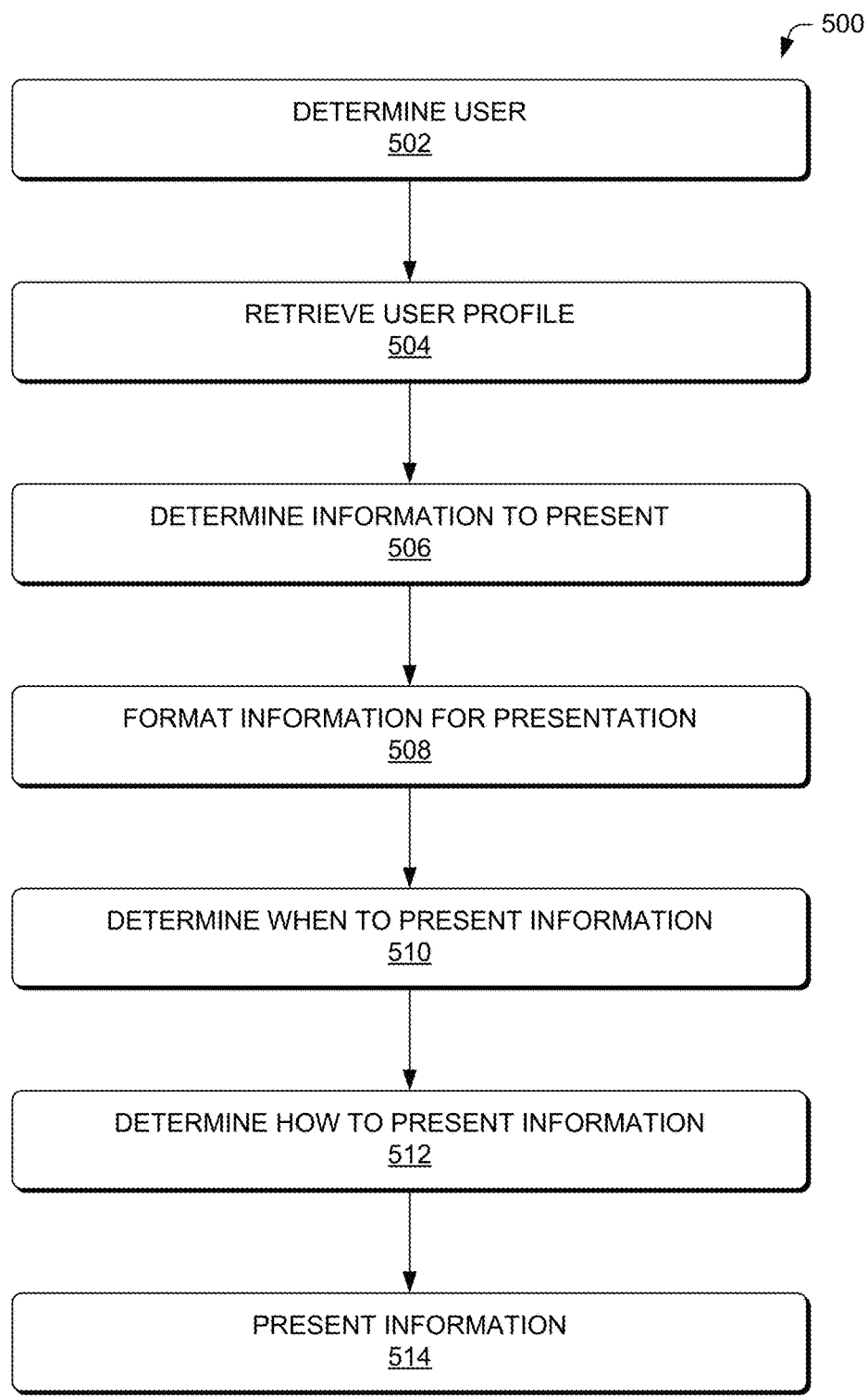
FIG. 5 is a flow diagram of an example process for personalizing and presenting information to a specific user interacting with the system of FIG. 1.

FIG. 5 illustrates an example process for personalizing information to be provided 500. At block 502, the system determines the identity of the user 102 interacting with the system 100. As previously described, this may be performed through voice print matching, facial recognition, RFID information, detecting a mobile user device 112 that has entered the environment, or through some other mechanism. At block 504, the system 100 retrieves a user profile associated with the identified user 102. The user profile may include information such as preferences, the skill level of the user 102 with various tasks, knowledge of various subjects, medical information, calendar information, and other such information that is specific to the user 102.

At block 506, the information to be provided to the user 102 is determined. This may be based upon object detection or action detection within the environment, upon notifications that the system 100 determines should be provided, in response to requests from the user 102, or through some other indication. The information may include, for example, reminders, educational information to assist the user in completing a task, new messages received from other parties, information regarding the environment, shopping lists, and others.

At block 508, the information is formatted for presentation to the user 102 via one or more user devices 112 or displays 110. The information may be converted from one format to another, such as from a video image to one or more still images, or from still images to line drawings, from a voice message to a text message, and so forth. This may be based on the type of information to be provided, the user device 112 upon which the information will be presented, or a combination. For instance, where a user 102 requests information on how to change a flat tire on their vehicle, the system 100 may provide an instructional video to the user 102 on a smartphone associated with the user 102 when the user is not near another convenient display 110. Where the system 100 determines that the user 102 has a medium skill level at auto repair, for example, the system 100 may extract a frame of video data from the instructional video that shows the jack points on the vehicle associated with the user 102. The frame of video data may also be converted to a line drawing or schematic to reduce bandwidth and provide the necessary information quickly to the user 102 since the system 100 will not need to display an entire video to a user 102 with more skill than a novice in order to complete the task.

At block 510, the system 100 determines when to present information to the user 102. For example, where the system analyzes data and recognizes that the user 102 is busy, or that delivering information would be inconvenient, the system 100 can deliver the message at a future time or when the user 102 is at a future location. As an example, where the system 100 determines that a plant within the house of the user 102 needs additional water, the system 100 may delay providing this information to the user 102 until the user 102 returns home from work. The system may determine that it provides no benefit to the user 102 to receive information about a house plant while the user 102 is away from the house and is unable to address the issue. However, where they system 100 determines that the user is away for an extended period of time, the system 100 may provide this information to the user 102 so that the user 102 can make arrangements to have the plant cared for in his absence.

At block 512, the system 100 determines how to present the information. In some embodiments, the system 100 may include more than one device for presenting information to the user 102. There may be multiple user devices 112, such as a smart phone, a tablet, a desktop computer, a laptop computer, a television, wearable devices, a sound system, or other such devices capable of providing information to a user. Additionally, the system 100 may further include one or more displays 110 that may be located throughout the home of the user 102. The system 100 determines how to present the information and where to present the information that is convenient for the user 102. Continuing with the preceding plant example, the system 100 may provide information related to the hydration needs of the plant on a display device that is in the same room as the plant. Additionally, if the system 100 determines that the issue has not been addressed, the system may escalate the notification by providing a text message on the smart phone of the user 102, and may do so, for example when the user 102 is in the same room as the plant. The system 100 may also determine that a simple text message is sufficient initially, but later provide an audible message, or depending on the skill level of the user with respect to caring for plants, provide additional detailed instruction in the form of an online article or a video presentation to increase the level of education and understanding of the user 102 with respect to plant care.

At block 514, the system presents the information to the user 102 on the determined device. As an example of the process of FIG. 5, the system 100 may, through determining the current context, recognize that the user 102 is in a business meeting when a phone call arrives to a mobile phone associated with the user 102. The system 100 may inhibit the mobile phone from ringing and interrupting the business meeting, and record a voice mail message instead. The voice mail message may be transliterated into text, and if the system determines that the message is urgent, deliver the message as a text message to a smartphone associated with the user 102 so that the user 102 may receive the message immediately without being interrupted. If, however, the system determines that the message may not be urgent, the message may be delivered to the user 102 either as a text message, an email, a voice message, or a combination, after the user 102 completes the business meeting.

Figure 6:
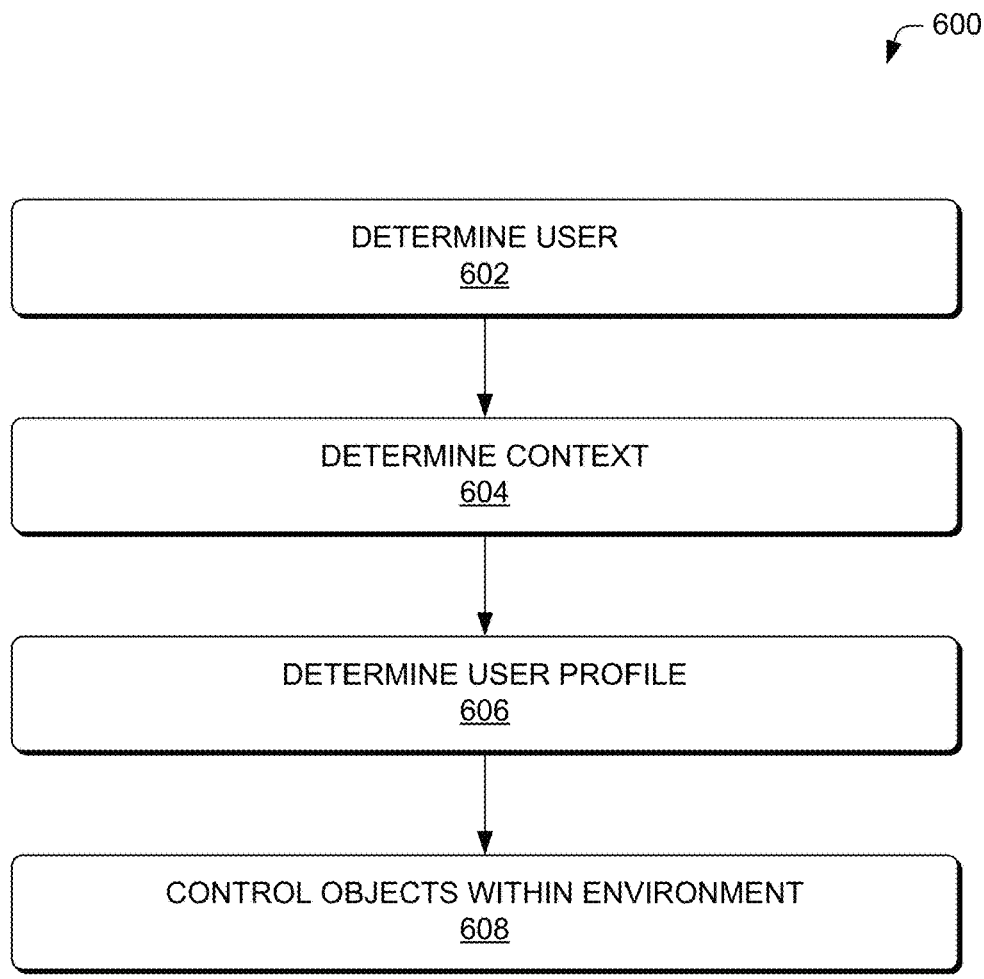
FIG. 6 is a flow diagram of an example process for controlling objects within the environment based upon contextual awareness.

FIG. 6 illustrates an example process of controlling objects 600 within the environment 104. At block 602, the system 100 determines the user 102, through any suitable method, several of which have been previously described. At block 604, the system 100 determines the context. This may include gathering data from sensors within the environment, sensors carried by the user 102, or some other method. In some cases, the system 100 utilizes the imaging sensors 106 and the audio sensors 108 to capture video and audio information about the environment. In some cases, the system 100 will capture data from one or more user devices 112 associated with the user 102, and may use a combination of sources to determine the context, which may also include object detection and/or action detection.

At block 606, the system 100 determines the user profile. Once the system 100 is able to identify the user 102, the system 100 may retrieve a profile associated with the user 102 which may include information such as name, age, health information, preferences, educational level, fields of study, friends and acquaintances, scheduling information, habits, allergies, skill level and knowledge in certain fields, among other things.

At block 608, the system 100 controls object within the environment. For example, where the system 100, through object detection, recognizes that the user has placed flour, sugar, eggs, milk, baking powder, and butter on the kitchen counter, the system may determine that the user is preparing to bake a cake. The system 100 may then turn on the oven to begin preheating the oven. The system 100 may turn on the oven automatically, may remind the user 102 to turn on the oven, or may ask the user 102 if the user 102 would like the system to turn on the oven. Based upon historical interactions with the user 102, the system 100 may recognize that the user 102 habitually forgets to turn on the oven and the system 100 may do so automatically in the future.

As another example, the system 100 may determine from the scheduling data of the user 102 that the user 102 had a busy schedule that day with many appointments with upper management. Upon capturing data indicating that the user 102 has arrived at home, such as by the audio sensors 108 capturing data indicating that the garage door has opened, or GPS data of the user's smart phone, the system 100 may automatically begin playing soothing music through a music system within the home and automatically turn on the gas fireplace to provide a comfortable atmosphere for the user 102.

Figure 7:
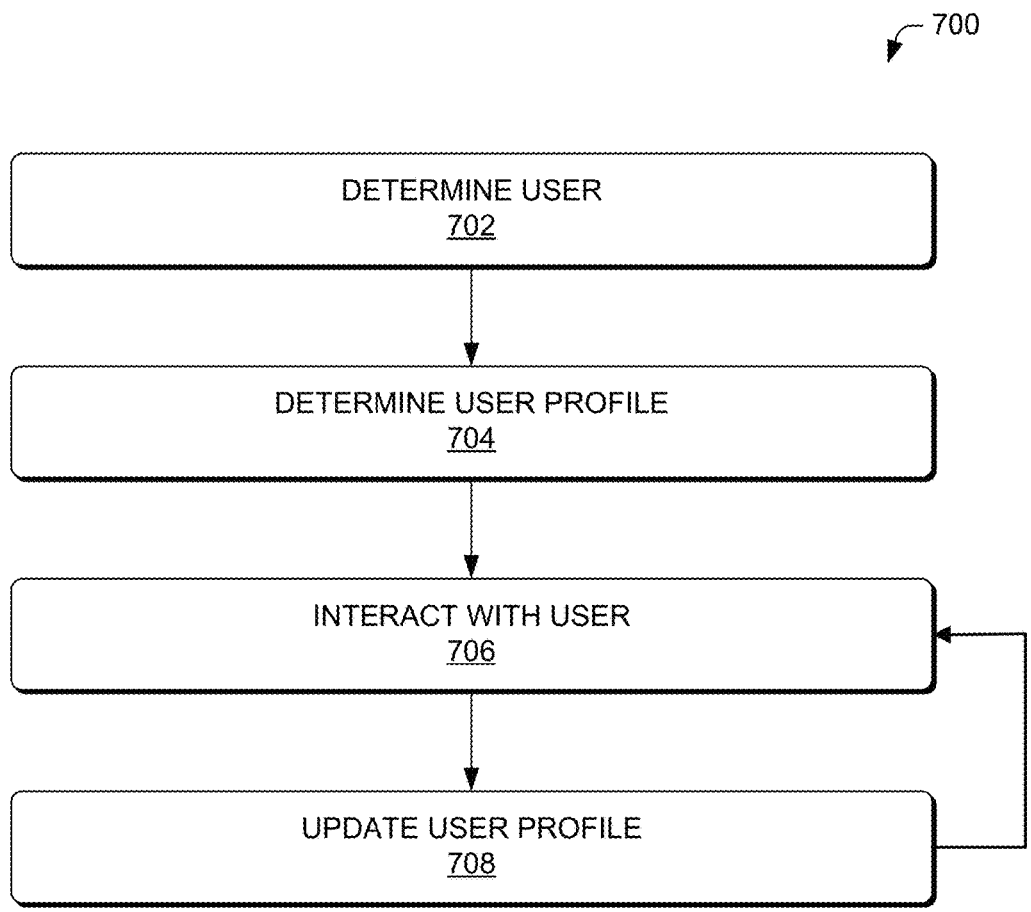
FIG. 7 is a flow diagram of an example process for machine learning through repeated interaction with a user.

FIG. 7 illustrates an example process of machine learning 700. At block 702, the system 100 determines the user 102 as previously described. At block 704, the system determines a profile associated with the user 102, such as by retrieving information from a database specific to the user 102. At block 706, the system 100 interacts with the user 102 via one or more user devices. The interaction may be through any of the sensors or user devices 112. Such interaction may occur, for example, as the user 102 talks to the system to retrieve information, as the user 102 interacts with the environment and performs various tasks, or as the user 102 repeats certain tasks, such as making coffee after waking up. In short, the interaction can be any information that the system 100 can gather that is relevant to a particular user 102.

At block 708, the system updates the user profile and stores additional information associated with the user. For example, where the system 100 identifies a pattern in which a particular user 102 wakes up at 7:00 am on Monday through Friday, activates a coffee maker at 7:05, and then turns on the shower to 102 degrees Fahrenheit, the system 100 may add this morning routine information to the user profile. Moreover, the system 100 may assist the user 102 with this routine by setting an alarm at 7:00 am and automatically activating the coffee maker, followed by turning on the shower and adjusting the temperature to the preferred temperature of 102 degrees Fahrenheit.

As further shown in FIG. 7, the system 100 may repeat the process of interacting with a user 102 at block 706 and updating a user profile at block 708. In this way, the system 100 learns habits, routines, and preferences, and can continually update the user profile with this information, along with additional information such as a user's skill or knowledge level with respect to certain topics and tasks. Moreover, once the system provides instruction to a user 102, such as how to chop carrots, for example, the system may update the profile associated with the user 102 to indicate that the user 102 already understands this topic and the system 100 may appropriately personalize future information provided to the user 102.

While the systems and methods disclosed herein provide some examples of how the system operates and what can be accomplished, additional examples will be provided as further illustration of the machine intelligent predictive communication and control system described herein.

Example I—Emotion Detection

As a user 102 enters the environment, a house, for example, the system 100, using the imaging sensors 106, can detect the pose of the user 102 as well as landmarks on the face of the user 102 and, based upon comparing the changes in landmarks from a baseline scan of the user 102, the system 100 can determine that the user 102 is experiencing sadness. For example, the system 100 may determine that the user is exhibiting drooping eyelids, turned down corners of the mouth, arched eyebrows, or tears emanating from the eyes. In some instances, the system 100 may turn on music on a user device 112 that has a tendency to counteract the feeling of sadness in the user 102. The system, using the control module 228, may power on a stereo receiver within the environment 104 and tune the receiver to an appropriate station, or play music stored on one or more user devices 112. Alternatively, the system 100 may, using the control module 228, turn on the television and display programming that is geared to make people happy or to laugh. In other instances, the system 100 may recommend to the user 102 that the system call the sister of the user 102, which historically has improved the mood of the user 102 and may initiate a voice call or a video call for the user 102.

The system 100 may store historical data about the user 102 that indicates the preferences of the user 102 during times of sadness and take appropriate future action according to the preferences.

Moreover, the system may determine that a user 102 is in a positive mood and is actively completing mundane household tasks. The determination of the positive mood may be made, for example, by the body language of the user 102, by the style of music chosen by the user 102, by determining that the user 102 is singing an upbeat song, by facial expressions, or other determined context of the user. The system 100 may determine that this is a good time to remind the user 102 to water their plants, and make an appropriate recommendation.

Example II—First Aid

The system 100 may determine that the context involves a user 102 cutting vegetables with a knife. For example, the system may rely on video data generated by the imaging sensors 106 and the object detection module 214 may analyze a frame of video data and determine that objects within the environment include a knife in the hand of the user 102 and vegetables on a cutting board. Additionally, through the action detection module 218, the system 100 may determine that the arm of the user 102 is manipulating the knife in a slicing motion to slice through the vegetables. The system 100 may then determine, based upon the identified knife, vegetables, and action, that the goal of the user is to slice the vegetables. The system 100 may determine, through the action detection module 218 or the object detection module 214, or both, that the reaction of the user 102 is one of pain and grasping a finger. Alternatively, the system 100 may detect dripping red liquid from the finger of the user 102. Through either of these instances, the system 100 may determine that the user 102 has accidentally cut his finger. The system 100 may then automatically provide advice on how to treat the wound to keep it clean and stop the bleeding. The system 100 may further advise the user 102 on where the bandages are located.

The system 100 may obtain and analyze imaging data of the wound and further determine that the wound requires stitches and may inform the user accordingly. Alternatively, the system 100 may obtain imaging data of the wound through the imaging sensors 106 and send it, via the communication module 226, to a medical professional who can make the determination whether stitches are required.

Example III—While Driving

Where a user 102 is in a vehicle, the system 100 may inhibit the user from receiving or sending phone calls or text messages through a smart phone associated with the user 102. The system 100 may utilize GPS data to determine that a user 102 is in a moving vehicle and may alter the functionality of user devices 112 that are associated with the user 102. Moreover, the system 100 may determine that the user 102 is riding in a passenger seat of the vehicle, rather than driving, and may permit functionality of user devices 112 accordingly. The system 100 may gather data through sensors located in the vehicle, such as an accelerometer worn on the wrist of a user 102, a camera of a mobile computing device, or through sensors built into the vehicle to determine whether the user 102 is operating the vehicle or is a passenger within the vehicle. Where the system 100 determines that the user 102 is operating the vehicle, the system 100 may delay delivery of certain messages, such as text messages, until it is safe for the user 102 to receive and respond to the messages.

As another example, where the system 100 determines, through GPS location data or otherwise, that the user 102 has spent the previous two hours in an establishment that serves alcohol, the system 100 may require that the user 102 submit to a blood alcohol level test before operating the vehicle. The blood alcohol level test may be administered by submitting a sample, such as breathing, onto an appropriate sensor.

Example IV—Healthcare

The profile data 212 associated with a user 102 may indicate certain health risks of a particular user 102. For example, a user 102 may have been diagnosed with diabetes and has a need to monitor his blood sugar. The system 100 may communicate with a blood sugar level monitor to track the blood sugar level of the user 102. The blood sugar level monitor may be a device that the user 102 implements periodically to check blood sugar levels, or may be an embedded monitor that provides continual data. The system 100 may track the blood sugar level and provide information to the user 102 if the blood sugar level exceeds a maximum threshold or drops below a minimum threshold. The system 100 may provide information to the user 102 indicative of the blood sugar level and provide suggestions for maintaining a healthy blood sugar level. The information may be provided to the user through any suitable device, such as through audible notifications through one or more user devices 112, through textual communication on one or more user devices 112, or through haptic communication on one or more user devices 112.

Similarly, absent chemical monitoring, the system 100 may watch for physical indications of issues with the blood sugar level of a user 102. For example, if a user 102 becomes unsteady on his feet, begins exhibiting slurred speech, or exhibits other tell-tale signs of low blood sugar, the system can warn the user 102, or other users within the area, that there is a potential health risk with the user 102. The system 100 may provide the notification commensurate with the severity of the situation. For example, where the system 100 previously notified the user 102 of a decreasing blood sugar level and the user did not take appropriate action and is now exhibiting physical symptoms of low blood sugar, the system 100 may provide escalated warnings to the user or to other users within a predetermined distance. For example, while the initial notifications to the user may have included a text message, or a haptic vibration through a watch worn by the user, the escalated warnings may include flashing lights, horns or sirens, audible warnings, or urgent voice or text-based messages to other users with the ability to help the user exhibiting symptoms of a dangerous condition.

Furthermore, where there is a severe health issue, such as, for example, where a user's blood sugar level plummets and the user 102 loses consciousness, the system can attempt to interact with the user 102, and if there is no response from the user, the system can alert medical professionals and request immediate help. In addition, the communication module 226 of the system 100 may be programmed to dial an emergency telephone number and explain the medical condition of the user 102 and the symptoms the user is exhibiting.

Example V—Dangerous Conditions

The system 100 may be configured to determine when there is a dangerous condition present. For example, the system 100 may be in communication with gas sensors within the environment 104 that are able to detect the levels of carbon monoxide within the environment 104. If the level exceeds a threshold, the system 100 may warn users within the environment 104 of the dangerous conditions. The warnings are preferably indicative of the severity of the condition, and may be configured as audible warnings, visual warnings, or a combination, and may escalate as the condition persists.

Similarly, where the system detects, through the object detection module 214 and the action detection module 218, that a user 102 within the environment 102 is engaging in a dangerous activity, such as dancing on a table for example, the system may warn the user 102 of the dangerous activity. Moreover, where the user 102 is identified as a small child, the system may warn a parent of the user 102 of the dangerous activity.

Example VI—Smart Control

Where the system 100 determines that a user 102 is in the kitchen and is preparing to bake a cake, the system may automatically turn on the oven to pre-heat it in order to bake the cake. For example, the system 100 may analyze imaging data captured by imaging sensors 106 to determine that the user has retrieved flour, sugar, eggs, vanilla, and baking powder, and in combination with calendar data that indicates that the daughter of the user a birthday the following day, the system 100 may fairly certainly determine that the user 102 is preparing to bake a cake, and may automatically turn on the oven to an appropriate temperature. If, however, the system 100 determines that the user 102 has left the environment 104, to talk to a neighbor or run to the store, the system 100 may automatically either turn down the oven, or turn off the oven completely. Of course, the system may initially turn down the oven and then turn off the oven if the user has failed to resume the baking activity within a predetermined amount of time.

EXAMPLE CLAUSES

According to some embodiments, a system includes an imaging sensor; an audio sensor; a display; one or more computing devices in communication with the imaging sensors, the audio sensor, and the display, the one or more computing devices having memory, one or more processors, and one or more modules stored in the memory. The modules are executable by the one or more processors to perform operations including determining, such as by analyzing at least one of imaging data generated by the imaging sensor or audio data generated by the audio sensor, an identity of a user. The modules are executable to additionally determine, by analyzing the imaging data, objects located within a field of view of the imaging sensor; receive location data that indicates a location of the user, determine, by analyzing the identity of the user, the audio data, the objects, and the location, a context of the user and a goal of the user; determine, based at least in part upon the context, information to be presented to the user to achieve the goal; determine, based at least in part upon a profile associated with the user, a knowledge level of the user and a level of complexity at which to present the information; determine an output device through which to present the information; transliterate, based at least in part on the context and the knowledge level of the user, the information for the output device; and present the information at the level of complexity through the output device.

In some instances, the imaging data comprises two or more frames, and the operations further include determining, based at least in part upon comparing the two or more frames of the imaging data, actions taking place within the field of view of the imaging sensor. The information to be presented to the user may include instructions related to the actions taking place within the field of view of the imaging sensor. Furthermore, the system may update the profile associated with the user based at least in part upon the information to be presented to the user. The presentation of information may be delayed based at least in part upon the location data indicating that the output device is moving.

Auxiliary devices may be provided and the one or more processors may send control instructions to one or more of the auxiliary devices. For example, to turn on or off devices, to control a setting, a schedule, or operation of the devices.

According to another implementation, a computer-implemented method includes (i) determining a location of a user, the location corresponding to an environment; (ii) receiving video data of the user within the environment; (iii) receiving audio data from the environment; (iv) determining, by analyzing at least one of the video data or the audio data, an identity of the user; (v) determining, by analyzing the video data, objects within the environment; (vi) determining, by analyzing at least one of the video data or the audio data, actions occurring within the environment; (vii) determining information to be presented to the user based at least in part on the actions occurring within the environment; (viii) retrieving a profile associated with the user, the profile indicating at least a skill level or a knowledge level of the user with respect to the actions occurring within the environment; (ix) transliterating, based at least in part upon the skill level or the knowledge level, the information to be provided to the user from a first format to a second format; and (x) presenting the information to the user in the second form.

In some cases, the method includes sending instructions to one or more objects within the environment to control the one or more objects. Presenting the information to the user may be based at least in part upon the location of the user. Moreover, determining the information to be presented to the user may be based at least in part upon the facial expression of the user. The skill level or the knowledge level of the user may be updated based at least in part upon the information presented to the user.

In some instances, a sensor located within the environment tracks and sends health information related to a living thing within the environment. The health related information could pertain to a plant, an animal, a person, or some other living thing.

The information may comprise a notification and the notification is presented to the user based at least in part on a determination that the user is within the environment. For example, a notification can be delivered to a user once the user enters the environment, such as a home.

The method may further include transliterating the information to reduce the complexity of the information based at least in part upon the profile associated with the user. That is, where an experience user needs less detail, or a novice user needs a lower level of complexity, the information is transliterated to the appropriate level of detail and complexity for the user. In addition, or in the alternative, the information may be one of video data, image data, a line drawing, voice data, text data, and the information may be transliterated to a second format that is a different one of video data, image data, a line drawing, voice data, or text data.

According to another embodiment, a system comprises one or more sensors; one or more display devices; and one or more computing devices. The computing devices include memory; one or more processors; and one or more modules stored in the memory and executable by the one or more processors to perform operations. The operations include (i) determine, through data generated by the one or more sensors, an identity of a user; (ii) determine, through the data generated by the one or more sensors, a location of the user, the location corresponding to an environment; (iii) determine, through the data generated by the one or more sensors, one or more objects located within the environment; (iv) receive a profile associated with the user, the profile including one or more of calendar data, preference data, a level of skill or knowledge of the user, or medical information associated with the user; and (v) control the one or more objects located within the environment based at least in part on the data generated by the one or more sensors, and the profile.

The operations may further include comprise determine, based at least in part upon the location, the objects, and the profile, information to be provided to the user. In another instance, the operations further include transliterating the information from a first level of detail to a second level of detail, wherein the second level of detail is more complex than the first level of detail.

The operations may further include determining a device upon which to present the information, and present the information on the device. In another embodiment, the system is able to turn on or off one or more objects within the environment.

CONCLUSION

Although the present disclosure may use language that is specific to structural features and/or methodological acts, the invention is not limited to the specific features or acts described herein. Rather, the specific features and acts are disclosed as illustrative forms of implementing the invention.

What is claimed is:

1. A system for providing predictive information based on complexity of an event and a knowledge level of an operator about the event, the system comprising:
   an imaging sensor;
   an audio sensor;
   a display;
   one or more computing devices in communication with the imaging sensors, the audio sensor, and the display, the one or more computing devices having memory, one or more processors, and one or more modules stored in the memory and executable by the one or more processors to perform operations to:
  receive, by a contextual server, a set of input data, wherein the set of input data comprising at least one of:
    imaging data from the imaging sensor, and
    audio data from the audio sensor;
  determine, by the contextual server based on the set of input data and an operator profile database, an operator;
  determine, by the contextual server based on the set of input data and an object database, at least one object;
  receive location data of the operator and the at least one object;
  determine, by the contextual server based on the operator and the at least one object, a context of the operator and a goal of the operator, wherein the context comprises at least one action by the operator upon the at least one object according to the set of input data, and wherein the goal comprises at least one intended action upon an intended object by the operator based on the operator profile database;
  identify, by the contextual server, a deviation of the context from the goal based on at least one difference between the at least one action and the at least one intended action;
  generate, by the contextual server based at least in part upon the identified deviation, the predictive information, wherein the predictive information comprises at least one of an advice, a reminder, a warning, and an instruction;
  determine, by the contextual server based at least in part upon the context and a profile associated with the operator, a level of complexity of the predictive information, wherein the level of complexity matches with the knowledge level of the operator about a subject matter of the context;
  determine, by the contextual server based at least upon the location data, an output device for providing through which to present the predictive information;
  transliterate, by the contextual server, the predictive information at the determined level of complexity and for the output device; and
  provide, by the contextual server, the transliterated predictive information through the output device.

2. The system of claim 1, wherein the imaging data comprises two or more frames, and the operations further comprise determine, based at least in part upon comparing the two or more frames of the imaging data, actions taking place within the field of view of the imaging sensor.

3. The system of claim 2, the operation further comprising to:
  wherein the predictive information to be presented to the operator comprises instructions related to the actions taking place within the field of view of the imaging sensor.

4. The system of claim 1, wherein the one or more processors further perform operations to update the profile associated with the operator based at least in part upon the predictive information to be presented to the operator.

5. The system of claim 1, wherein present the predictive information at the level of complexity through the output device is delayed based at least in part upon the location data indicating that the output device is moving.

6. The system of claim 1, further comprising auxiliary devices, and the one or more processors further perform operations to send control instructions to one or more of the auxiliary devices.

7. A computer-implemented method for providing information based on complexity of an event and a knowledge level of an operator about the event, the method comprising:
  receiving, by a contextual server, a location of an operator, wherein the location corresponds to an area;
  receiving, by the contextual server, video data of the operator within the area;
  receiving, by a contextual server, audio data from the area;
  determining, by the contextual server analyzing at least one of the video data or the audio data, an identity of the operator;
  determining, by the contextual server analyzing the video data, one or more objects within the area;
  determining, by the contextual server analyzing at least one of the video data or the audio data, actions by the operator occurring within the area;
  determining, by the contextual server, information to be presented to the operator based at least in part on the actions occurring within the area in a first format, wherein the information comprises at least one of an advice, reminder, a warning, and an instruction;
  retrieving, by the contextual server, a profile associated with the operator, the profile indicating at least one of a skill level and a knowledge level of the operator with respect to the actions occurring within the area;
  transliterating, by the contextual server, the information to be provided to the operator from the first format to a second format based at least in part upon one of the skill level and the knowledge level; and
  presenting, by the contextual server, the transliterated information to the operator in the second format.

8. The method as in claim 7, further comprising sending, by the contextual server, instructions to the one or more objects within the area to control the one or more objects.

9. The method as in claim 7, wherein presenting the information to the operator is based at least in part upon the location of the operator.

10. The method as in claim 7, wherein determining the information to be presented to the operator is based at least in part upon the facial expression of the operator.

11. The method as in claim 7, further comprising updating, by the contextual server, the skill level or the knowledge level of the operator based at least in part upon the information.

12. The method as in claim 7, further comprising receiving, la the contextual server from a sensor located within the area, health information related to a living thing within the area and wherein the information comprises the health information.

13. The method as in claim 7, wherein the information comprises a notification and the present the information to the operator is based at least in part on a determination that the operator is within the area.

14. The method as in claim 7, wherein the information is transliterated to reduce the complexity of the information based at least in part upon the profile associated with the operator.

15. The method as in claim 7, wherein the first format comprises at least one of video data, image data, a line drawing, voice data, and text data, and wherein the second format comprises a data format other than the first format.

16. A system for providing predictive information based on complexity of an event and knowledge levels of at operators about the event, the system, comprising:
one or more sensors;
one or more display devices; and
one or more computing devices comprising:
memory;
one or more processors; and
one or more modules stored in the memory and executable by the one or more processors to perform operations comprising:
determine, through data generated by the one or more sensors, an identity of a first operator;
determine, through the data generated by the one or more sensors, a location of the first operator, the location corresponding to an area;
determine, through the data generated by the one or more sensors, one or more objects located within the area;
receive a first profile associated with the first operator, the first profile comprising one or more of calendar data, preference data, a level of skill or knowledge of the first operator, and information associated with the first operator;
determine, based on the first operator and the one or more objects, a first context of the first operator and a first goal of the first operator, wherein the first context comprises at least an action by the first operator upon the one or more objects, and wherein the first goal comprises at least a first intended action upon an intended object by the first operator based on the first profile;
identify, by the contextual server, a deviation of the first context from the first goal based on at least one difference between the at least one action and the at least one intended action; and
control the one or more objects located within the area based at least in part on the at least one deviation of the first context from the first goal.

17. The system as in claim 16, wherein the operations further comprise:
determine, through data generated by the one or more sensors, an identity of a second operator;
receive a second profile associated with the second operator, the second profile comprising one or more of calendar data, preference data, a level of skill or knowledge of the second operator, and information associated with the second operator;
determine, based on the second operator and the one or more objects, a second context of the second operator and a second goal of the second operator, wherein the second context comprises at least an action by the second operator upon the one or more objects, and wherein the second goal comprises at least a second intended action upon an intended object by the second operator based on the second profile;
identify, by the contextual server, a deviation of the second context from the second goal based on at least one difference between the at least one action and the at least one intended action;
control the one or more objects located within the area based at least in part on the at least one deviation of the second context from the second goal;
determine, based at least in part upon the location, the one or more objects, and the first profile, a first predictive information to be provided to the first operator; and
determine, based at least in part upon the location, the one or more objects, and the second profile, a second predictive information to be provided to the second operator.

18. The system as in claim 17, wherein the operations further comprise transliterate the predictive information from a first level of detail to a second level of detail, wherein the second level of detail is more detailed than the first level of detail.

19. The system as in claim 16, wherein the operations further comprise determine a device upon which to present the information, and present the information on the device.

20. The system as in claim 16, wherein control the one or more objects comprises changing settings of the one or more objects.

* * * * *